June 8, 1926.

F. W. JACOB 1,587,733

FOOTBALL STRATEGY GAME APPARATUS

Filed Dec. 26, 1925   5 Sheets-Sheet 1

Fig. 1

INVENTOR.
Francis W. Jacob
BY Thomas A. Jenkins Jr.
ATTORNEYS.

June 8, 1926.　　　　　　　　　　　　　　　　　　　1,587,733
F. W. JACOB
FOOTBALL STRATEGY GAME APPARATUS
Filed Dec. 26, 1925　　　5 Sheets-Sheet 4

INVENTOR.
BY Francis W. Jacob
Thomas A. Jenckes Jr.
ATTORNEYS.

June 8, 1926.  
F. W. JACOB  
1,587,733  
FOOTBALL STRATEGY GAME APPARATUS  
Filed Dec. 26, 1925   5 Sheets-Sheet 5

INVENTOR.  
Francis W. Jacob  
BY Thomas A. Jenkins Jr.  
ATTORNEYS.

Patented June 8, 1926.

1,587,733

UNITED STATES PATENT OFFICE.

FRANCIS W. JACOB, OF PROVIDENCE, RHODE ISLAND.

FOOTBALL-STRATEGY GAME APPARATUS.

Application filed December 26, 1925. Serial No. 77,899.

My invention relates to a game of football, adapted to be played with cards. Within the knowledge of the applicant, "football strategy" is the only "indoor football" game in which actual knowledge of the technique of the game, good football judgment, and originality combined with soundness of method are at a premium. It is thus much more closely assimilated to the real game as played in colleges and schools than the ordinary game based on football.

This claim is based on two grounds:—

1. Instead of one player selecting his play, and its success being determined by chance on the card he turns, as in some games of this general type, both players are constantly participating, and the success of the one on the offensive is directly proportioned to his ability in selecting plays which his opponent does not expect or provide for.

2. At the same time, the player is decidedly restricted to sound principles of football strategy; for if he sacrifices these to unsound or fanciful types of play in the hope of securing originality the arrangement of the game is such that these errors penalize themselves in the course of play.

Further, the game is assimilated to actual football, and to the physical as well as the mental conditions to be met, by providing for some of the common phenomena of the game,—for example the following:—

1. The natural stiffening of the defense near its own goal line.

2. The impossibility of attempting field goals from certain angles or distances.

3. Placing of punts so as to roll outside within the defensive twenty yard line, instead of rolling into touch.

4. The "breaks" of the game—though these last are always restricted by the method which places a premium on versatility in attack and intelligent analysis on defense.

Each player succeeds or fails as he exercises better or poorer football judgment than his opponent, and "outguesses" his opponent. Gains are proportioned on this principle. The attacking player selects, say, a play which the defensive player wholly fails to anticipate. The offense gains, say, 7 yards. Or the defensive player partially analyses his opponent's plans; the gain is then, on this same play, 3 yards, or 4 yards. The defensive player analyses exactly the type of attack and point of attack intended by his opponent. Instead of a gain there is, say, a loss of 2 yards for the offensive team. As will be seen from an inspection of the rules, this method is in force in every play of the game (except the kick-off), and as a result the outcome depends much more on strategy than on chance. The only chance involved is the actual amount of gain, which varies far more on the success of the analysis than on what particular card is turned in a given instance.

In other games of this type, so far as is known, the defensive player must sit by helpless, watching the success of his opponent as he turns the cards indicating the amount of gain.

In this game, the intelligence of the defense plays as great a part as in the actual game. The only element which is not provided for, which appears in the actual game, and which cannot be provided for, is the physical difference between the contestants—weight, condition, and the like.

While originality plays a great part in the success of the participant, he cannot succeed by it at the expense of sound football. If he attempts a forward pass close to his own goal line, on fourth down, or under other circumstances where a forward pass is usually unwise, he will succeed only if his opponent is wholly off his guard, and not always then. If he runs an end toward a nearby side-line, he cannot gain much. Mere versatility will not suffice him, unless he knows when it is sound football to be versatile. Extensive experiment with men who know the game, and men who do not, has shown this to be true.

It is submitted that with most such games, as used by coaches in training quarterbacks, the coach must stand by and offer criticisms and correct errors, and that such games have no intrinsic instructive value. This game, however, a coach may safely instruct his men to use at any time, since it will itself correct their errors of judgment, without need for an advisor. It is on this primarily that the claim for improvement and greater utility is to be based.

One object of my invention, therefore, is to provide a football game in which both players are constantly participating and each player is constantly using his head in diagnosing the play.

A further object of my invention is to provide a game of indoor football adapted to be played with cards, which is designed to simulate as far as possible actual football conditions.

These and such other objects of my invention as may hereinafter appear will be best understood from a description of one embodiment thereof, such as is shown in accompanying drawings.

In the drawings

Figs. 2 to 22 are plan views of specimen play control cards, Figs. 2 and 5 being sample end play control cards, Figs. 3, 4, 6 and 7 being sample line play control cards, Figs. 11, 12 and 13 being sample pass play control cards, Figs. 15–19 being sample kick play control cards, and Figs. 8, 9, 10, 14, 20 and 21 being sample trick play control cards.

Figure 1:
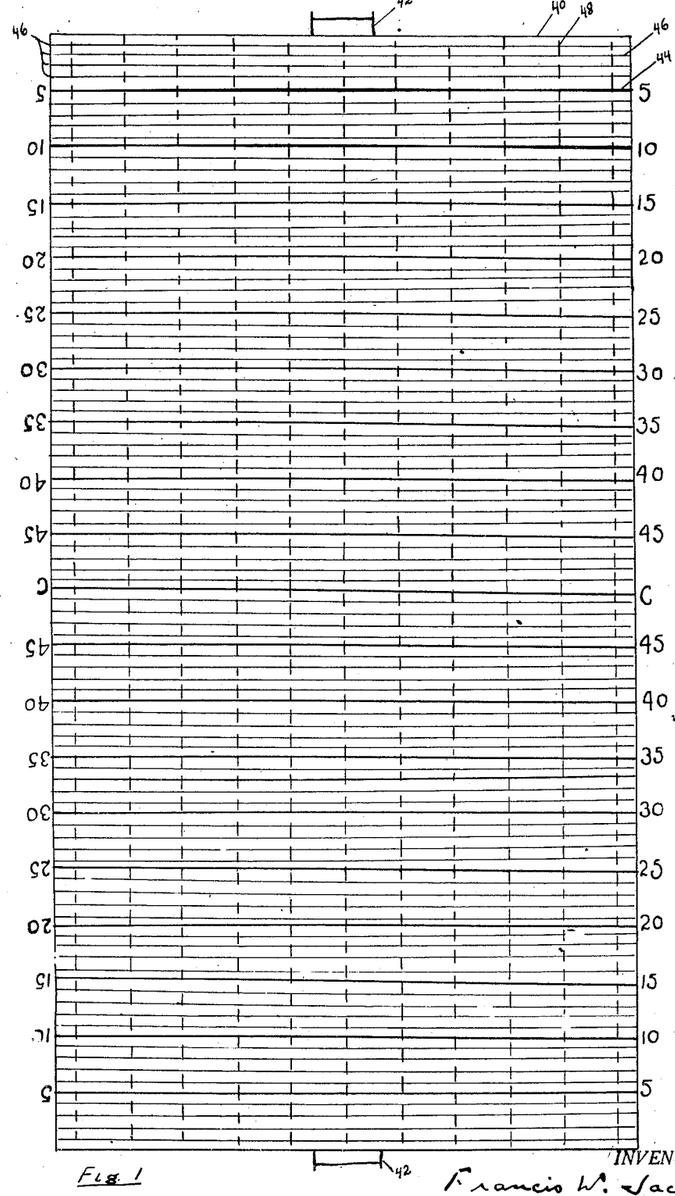
Fig. 1 is a plan view of a board having goals and graduations thereon in simulation of a football field.

In the drawings, wherein like characters of reference indicate like parts throughout, 40 indicates a board constructed of any suitable material provided with the goals 42 at each end thereof and the field intermediate of the goals being ruled in parallel cross lines to indicate the 100 yards between goals, the 5 yard lines 44 being heavy and the 1 yard lines 46 being light, said lines thus providing a field with transverse graduations. The field 40 is also preferably provided with the longitudinal graduated lines 48 at 5 yard intervals across, the interval at each side of the field to the first line being less than 5 yards to proportion the board to an actual football field. The transverse graduated heavy lines 44 are preferably consecutively numbered beginning at each goal from 5 to 50, the latter being the center line C equally distant from the goals.

Figure 39:
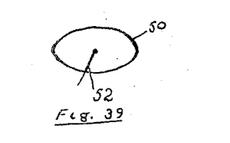
Fig. 39 is a plan view of a piece employed in simulation of a football.

I provide a piece 50, preferably shaped in simulation of a football, and preferably provided with a pin 52 inserted centrally thereof. Said football 50 is adapted to be moved over the face of the board 40 and the pin 52 provides said football 50 with means for detachable securement to the board.

Figure 37:
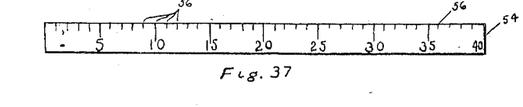
Fig. 37 is a plan view of a measuring scale, graduated in units of the board.

I also provide a measuring scale 54 provided with the graduations 56 of like scale with the graduations on the board.

Figure 38:
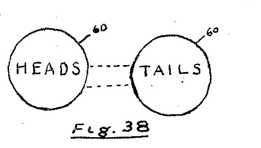
Fig. 38 is a plan view of a coin employed as chance controlled means.

I also provide the coin 60 adapted to be used as required as chance controlled means.

I also provide play control cards, preferably as shown in Figs. 2 to 22, each of the main play control cards as shown in Figs. 2 to 7, 11 to 13 and 15 to 19 being provided with the indicia 60 specifically indicative of the exact nature and direction of play. If desired, and as shown in my preferred embodiment, said offensive play control cards are preferably divided into sets, each set bearing indicia 62 of generically different offensive plays. In my preferred embodiment shown, I have provided four distinctive sets, the set 70 being shown in Figs. 2 and 5 and comprising an end set 70; the set 72 being shown in Figs. 3, 4, 6 and 7 and comprising a line set 72; the set 74 being shown in Figs. 11, 12 and 13 and comprising a pass set 74 and the set 76 being shown in Figs. 15, 16, 17, 18 and 19 comprising a kick set 76. It is thus obvious that each card specifically described has indicia 62 thereon indicative of the generic nature of the play and the indicia 60 thereon specifically indicative of the exact nature and direction of play.

Figure 2:
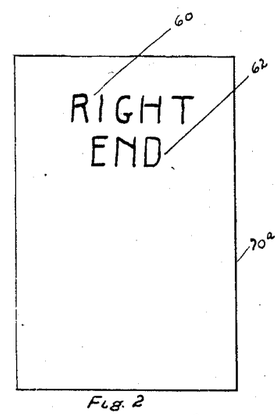
Figure 5:
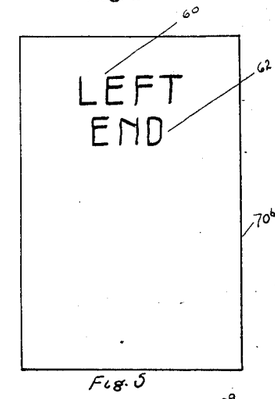

The card $70^a$ as shown in Fig. 2 thus is a right end card and the card $70^b$ as shown in Fig. 5 is a left end card, said cards $70^a$ and $70^b$ comprising the set 70 of end play control cards.

Figure 3:
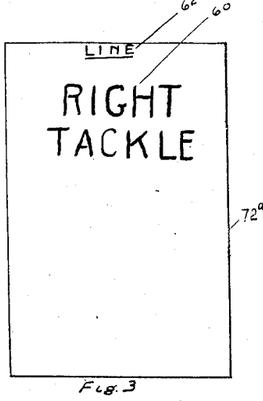
Figure 4:
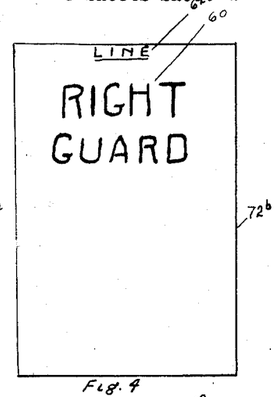
Figure 6:
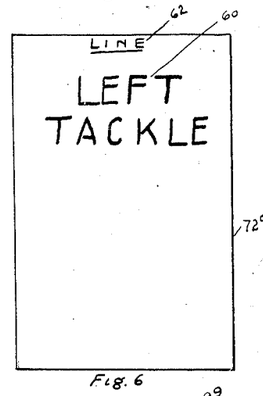
Figure 7:
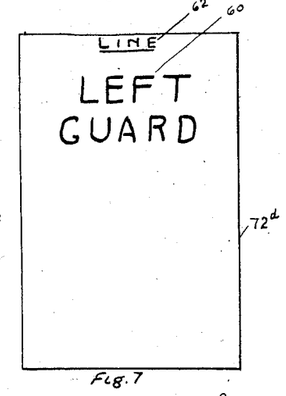
Figure 8:
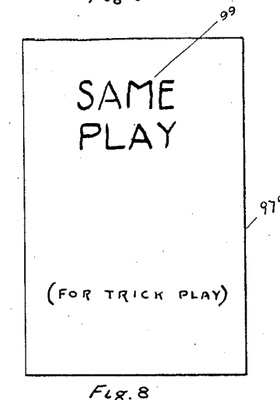
Figure 9:
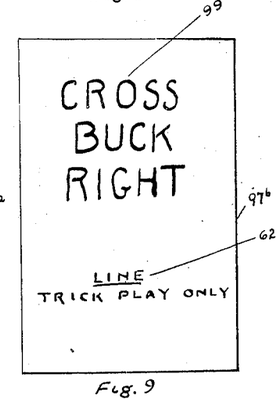
Figure 10:
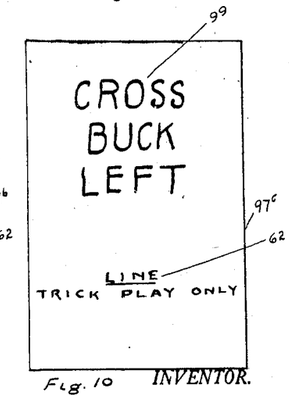

The card $72^a$ as shown in Fig. 3 is a right tackle card; the card $72^b$ as shown in Fig. 4 is a right guard card; the card $72^c$ as shown in Fig. 6 is a left tackle card and the card $72^d$ as shown in Fig. 7 is a left guard card, said cards $72^a$, $72^b$, $72^c$ and $72^d$ thus forming the set 72 of line play control cards.

Figure 11:
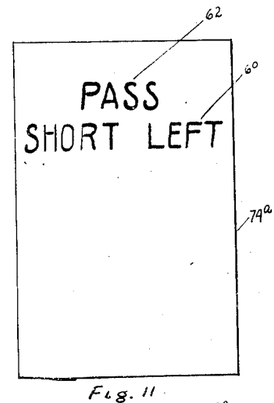
Figure 12:
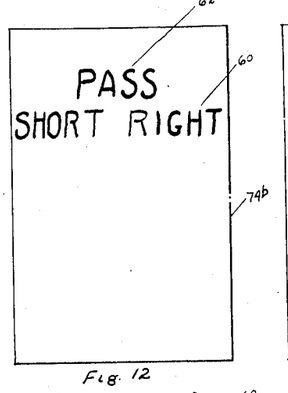
Figure 13:
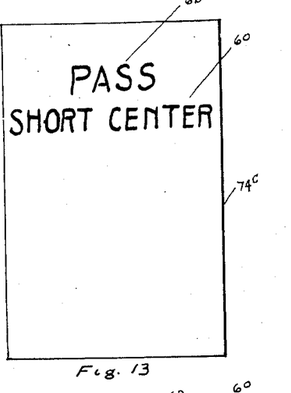
Figure 14:
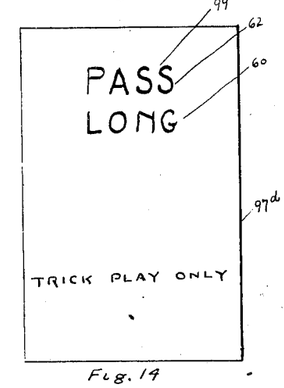

The card $74^a$ as shown in Fig. 11 is a pass short left card; the card $74^b$ as shown in Fig. 12 is a pass short right card; the card $74^c$ as shown in Fig. 13 is the pass short center card, said cards $74^a$, $74^b$ and $74^c$ thus forming the set 74 of pass play control cards.

Figure 15:
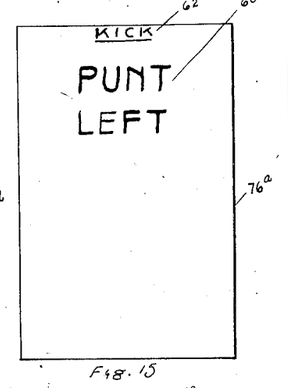
Figure 16:
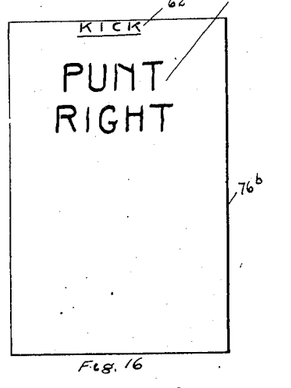
Figure 17:
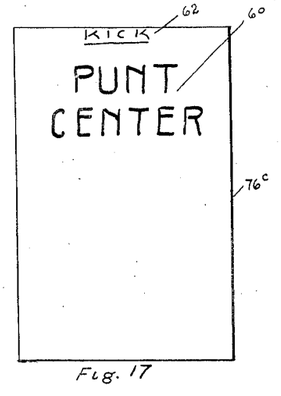
Figure 18:
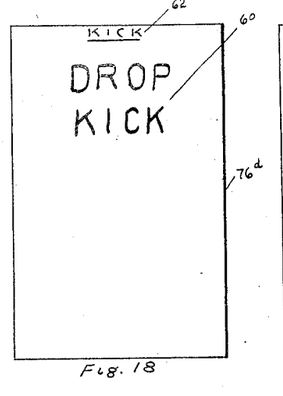
Figure 19:
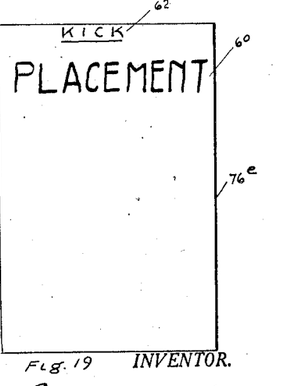
Figure 20:
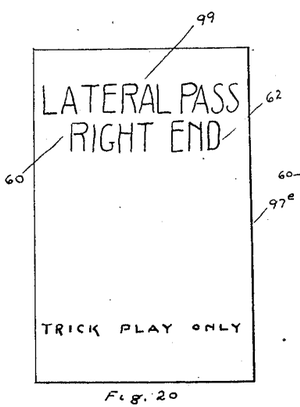
Figure 21:
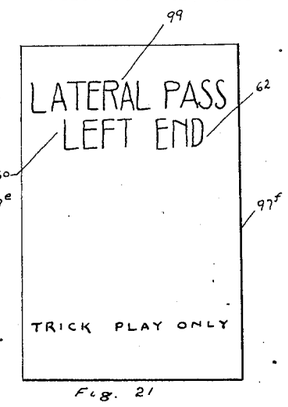

The card $76^a$ as shown in Fig. 15 is a punt left card; the card $76^b$ as shown in Fig. 16 is a punt right card; the card $76^c$ as shown in Fig. 17 is a punt center card; the card 76ᵈ as shown in Fig. 18 is a drop kick card and the card 76ᵉ as shown in Fig. 19 is a placement kick card, said cards 76ᵃ, 76ᵇ, 76ᶜ, 76ᵈ and 76ᵉ thus forming the set 76 of kick play control cards.

As will be apparent, said play control cards are adapted to be selectively chosen by the offensive player and laid face down.

Figure 23:
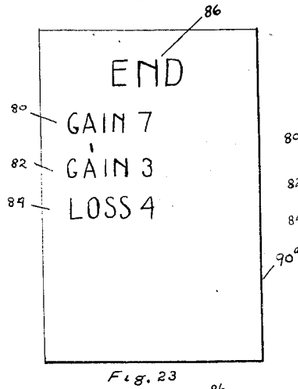
Figs. 23 to 36 are plan views of sample play success cards, Figs. 23 and 24 being end play success cards, Figs. 25–28 being line play success cards, Figs. 29 and 30 being trick play success cards, Figs. 31 and 32 being pass play success cards and Figs. 33 to 36 being kick play success cards.
Figure 24:
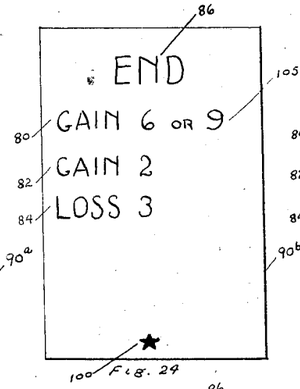

To co-operate with said play control cards, I provide play success cards. Each play success card is adapted to be individually turned in shuffled rotation face down by another person, either the defensive player or an umpire, if one is employed, card for card with the offensive control cards. Each play success card is provided with graduated indicia of success thereon. In my preferred embodiment, there are three graduations of success thereon, 80, 82 and 84. Said play success cards are also preferably divided into sets, all the cards of one set having indicia 86 thereon generically similar to generic indicia 62 on the play control cards. In order that the element of chance may come in, the different play success cards are, of course, provided with different indicia of success from other play success cards. The card 90ᵃ shown in Fig. 23 and the card 90ᵇ shown in Fig. 24 are specimens of a set 90 of end play success cards.

Figure 25:
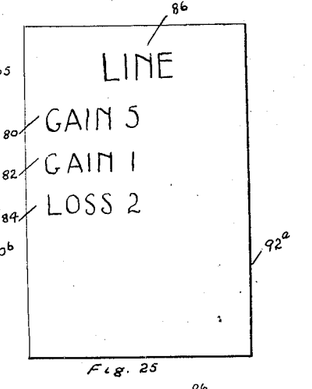
Figures 26, 27:
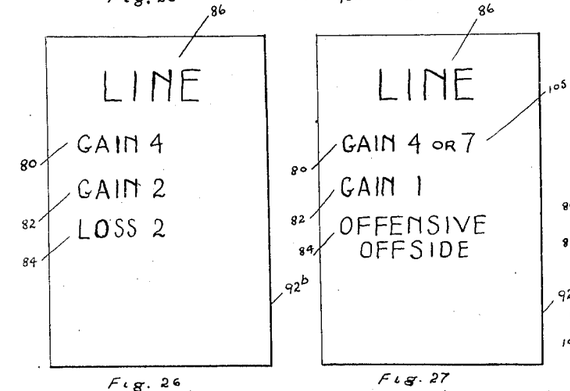
Figure 28:
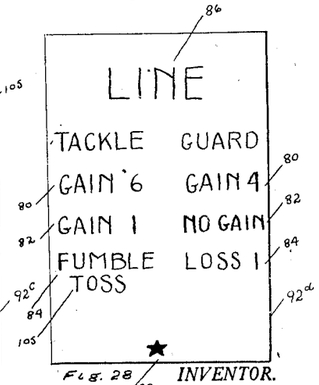

The card 92ᵃ shown in Fig. 25, the card 92ᵇ shown in Fig. 26, the card 92ᶜ shown in Fig. 27 and the card 92ᵈ shown in Fig. 28 are sample cards of the set 92 of line play success cards.

Figure 31:
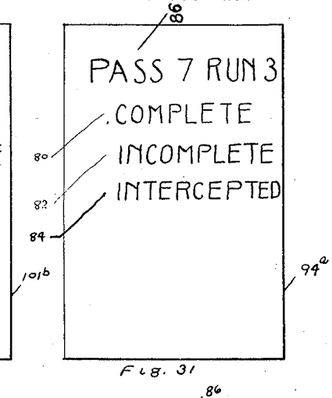
Figures 32, 33, 34:
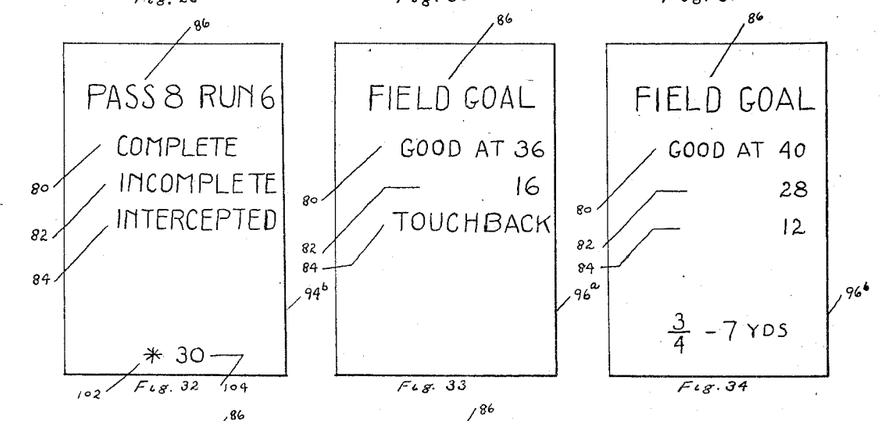

The card 94ᵃ shown in Fig. 31 and the card 94ᵇ shown in Fig. 32 are samples of the set 94 of pass play success cards.

Figure 35:
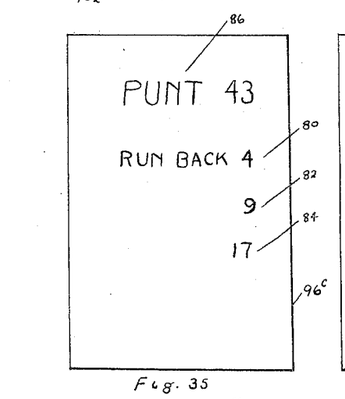
Figure 36:
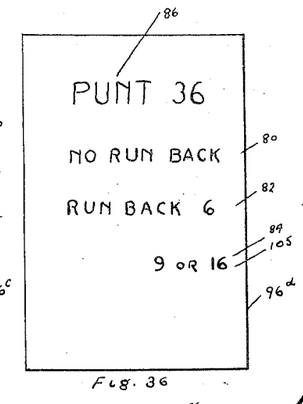

The field goal card 96ᵃ shown in Fig. 33, the field goal card 96ᵇ shown in Fig. 34, the punt card 96ᶜ shown in Fig. 35 and the punt card 96ᵈ shown in Fig. 36 are specimens of the set 96 of kick play success cards.

As will be apparent the game may be fully played with the apparatus described so far, even omitting dividing the play control and play success cards into sets with co-operative generic indicia thereon. In order to supply variations in the play and to more accurately simulate actual football conditions, I preferably provide certain of said play success cards with separate indicia thereon indicative of a different degree of success when employed in certain parts of the board. Thus I provide certain of said line play success cards 92, such as the card 92ᵈ shown in Fig. 28, with a star or other suitable indicia 98 to indicate a lesser proportion of success when approaching the opponent's goal.

As shown in the end play success card 90ᵇ, shown in Fig. 24, I may also provide certain of said end play success cards with a star or other indicia 100 indicative of a lesser degree of success when a play is chosen in the direction of an adjacent side line.

I may also provide certain of said pass play success cards 94, such as the pass play success card 94ᵇ shown in Fig. 32, with an asterisk 102 or other suitable insignia indicative of a lesser degree of success if the card is employed near a goal line, said card being also preferably provided with a distance mark 104, such as the distance mark 30 shown in card 94ᵇ, to indicate the distance from the goal line that such indicia 102 shall take effect.

To bring in the element of chance or breaks of the game that are always present, I preferably also provide certain of said play success cards with alternative indicia of success thereon, such as the alternative indicia of success 105, "9 or 16" shown on the punt play success card 96ᵈ, the fumble indicia of success 105 shown on the specimen line play success card 92ᵈ, the indicia 105 "6 or 9" on the specimen end play success card 90ᵇ shown in Fig. 24, the indicia 105 "4 or 7" shown on the specimen play success card 92ᶜ shown in Fig. 27. Whenever cards bearing said alternative indicia of success 104 are turned, the chance controlled means or coin 60 may be employed and called to indicate which side shall prevail. Thus on the card shown in 96ᵈ whether the distance run back shall be 9 or 16, and on the line play success card 92ᵈ whether the offensive or defensive side shall recover the ball on the fumble, etc.

To further provide the game with additional features more accurately simulating a real game of football, I preferably provide an additional set of trick play control cards 97ᵃ, 97ᵇ, 97ᶜ, 97ᵈ, 97ᵉ and 97ᶠ shown respectively in Figs. 8, 9, 10, 14, 20 and 21, said trick play control cards being adapted to be used in conjunction with the regular play control cards and to be selected by the offensive player alternately therewith whenever he desires to employ a trick play. Said trick play control cards are also provided with suitable insignia 99 indicative of the nature of play, the card 97ᵃ shown in Fig. 8 being provided with the indicia 99, "same play", the card 97ᵇ being provided with the indicia 99 "Cross buck right", the card 97ᶜ being provided with the indicia 99 "Cross buck left", the card 97ᵈ being provided with the indicia 99 "Pass long", the card 97ᵉ being provided with the indicia 99 "Lateral pass right end", and the card 97ᶠ being provided with the indicia 99 "Lateral pass left end".

Figure 29:
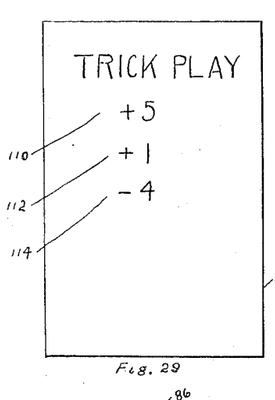
Figure 30:
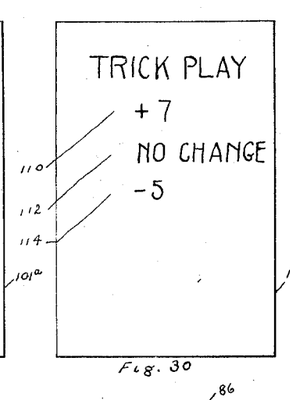

To co-operate with said trick play control cards, I also preferably employ a set of trick play success cards adapted to be turned by another person, either the defensive player or the umpire where employed, in addition to a respective play success card as hitherto explained, whenever a trick play control card 97 is selected by the offensive player. Sample trick play success cards are shown at 101ᵃ and 101ᵇ respectively in Figs. 29 and 30. Said trick play success cards are provided with suitable graduated indicia thereon, preferably with the three graduated indicia 110, 112 and 114, each being indicative of different degrees of success. The indicia 110, 112 and 114 are adapted to be added to or subtracted from the degree of success indicated by the play success card depending on whether the trick play is correctly diagnosed or not, being subtracted if correctly diagnosed and added if incorrectly diagnosed.

Figure 22:
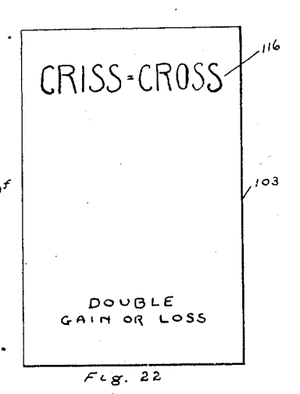
Fig. 22 is a plan view of an additional (crisscross or variable) play control card.

To provide an additional feature of chance, the use thereof depending upon the speculative nature of the offensive player, I preferably also provide an additional variable play control card 103, preferably provided with the indicia "Crisscross" 116 adapted to be chosen in addition by the offensive player as desired and effective to change the proportion of gain or loss as evidenced by the turned play success card.

Arrangement for play.

Before beginning the game, players arrange the play success cards, face down, in five sets, piles or stacks. These stand on the table by the board or "field", in a convenient position, since they are to be in constant use. They may be shuffled, though they are varied enough so that no particular sequence, unless very carefully prearranged, could have any effect at all, and then but little. In one pile are cards with backs marked "End". In another are cards with backs marked "Line". In a third are those with backs marked "Pass", in a fourth those with backs marked "Kick". In the fifth are those with backs marked "Trick play".

The play control cards will change hands constantly throughout the game, being always in the hands of the player having the offensive. At the kick-off they are in the hands of the receiver.

Before kick-off, there is toss for choice of end of field or kick, as in the real game; before the game it should be decided whether or not there is to be a wind (see below), and, if there is no referee or umpire, who is to perform the various duties of turning the cards, moving the ball, etc., as described below. The length of the periods is also to be determined at this time (see suggestion as to this under "Miscellaneous provisions and suggestions").

These preliminaries being settled, the game proceeds as described hereinafter.

Kick off.

Turn the top card of the Kick stack. For the kick-off use the punt distance. This shows the distance which the ball carries from mid-field. The second figure indicating the distance of the run back is the proper one, since on kick-off the run back is on general averages fairly uniform.

Play (for trick plays, see below).

The receiver of the kick-off now has the ball, and holds the play control cards in his hands. He selects the card naming the play which he wishes to make, and places it face down before him on the table.

The defensive player now tries to analyze the play, and the closer he comes to doing so the less the offensive player will gain. The first guess of the defensive player must be of the general type of play only, not of exactly where the play is to go. Using his judgment, and forming his opinion from the general situation in the game, he will guess one of the following four:

1. Line play. 2. End play. 3. Forward pass. 4. Kick.

The offensive player must now state whether or not his opponent has correctly guessed the general type from among those above. He simply says "yes", or "no"; nothing more.

If the defensive player has not guessed correctly the general type, he now guesses another general type.

If he has guessed the general type which the player with the ball is trying, he now tries to guess the exact point of attack.

Thus, if he has correctly guessed line play, he now guesses either,—1, Right tackle; 2, Right guard; 3, Left tackle; or 4, Left guard. If he has correctly guessed end run, he now guesses either,—1, Right end, or 2, Left end. If he has correctly guessed forward pass, he now guesses either,—1, Short right; 2, Short left; 3, Short center. If he has correctly guessed kick, he now guesses either,—1, Punt right; 2, Punt center; 3, Punt left; 4, Drop kick, or 5, Placement.

When the defensive player has made two guesses, the offensive player turns over the play control card which he had face down on the table, disclosing to his opponent the play he actually had in mind.

The defensive player has now done one of three things: Either,—1, he has failed even to analyze the generic type of play; or 2, he has guessed the generic type, but not the specific point of attack; or 3, he has guessed the exact play named on the play control card.

When the offensive player turns his play control card, the umpire, if there is one, or if not, the defensive player, turns the top card on the pile representing the general type of play end, line, pass, or kick, as the case may be—which the offensive player has selected. On this card, under the appropriate heading, appear indicia indicative of three alternative developments of the play in question.

The alternative at the top is the one most favorable, the one at the bottom the one least favorable to the attacking side.

If the defensive player failed even to guess the generic type, the play as moved on the board will be the first of the three alternatives.

If the defensive player guessed the generic type, the play will be the second of the three alternatives.

If the defensive player guessed the exact play, the last of the alternatives will be moved on the board.

The ball is moved on the "field" so as to show the development of this play, as the case may be.

For example:

Harvard, having the ball, puts face down the play control card Right tackle.

Yale says: "End." Harvard: "No."

(Second guess) Yale says: "Line." Harvard turns his card over.

(Yale analyzed the generic type, but not the exact point of attack.)

Yale (or the umpire) turns over the line play success card on top of the line pile, and under "Line" appears, let us say: gain 5, gain 3, loss 1.

The play was partly analyzed, so the second applies: Harvard gains 3. This is shown on the field by moving the ball three yards ahead for Harvard.

Second down, seven to go.

Harvard puts down "Left guard."

Yale. "Line?" Harvard. "Yes." Yale. "Left guard?" Yale (or the umpire) takes the next card from the top of the "Line" play success pile. Under "Line" appears, say, gain 4, gain 1, loss 2.

The exact point of attack was analyzed, so Harvard loses two yards. Third down, nine to go.

Harvard puts down "Punt left."

Yale: "Pass?" Harvard: "No." Yale: "Line."

Harvard turns card. The next card on the kick pile is taken, and under "Punt" appears, punt 44, run back 3, 9, 17.

Yale having failed to analyze the play at all, the ball, after going forward forty-four yards to indicate the Harvard punt, is returned three yards to indicate the Yale return. First down, ten yards to go, as in the actual game.

As each of the play success cards indicating the development of the play is used, it is put face down at the bottom of the pile from which it was taken.

These cards should be shuffled between the halves.

The play control cards are taken back into the offensive player's hands as soon as the play has been revealed, and there is of course no restriction on his using the same play as many times as he wants, and in succession as often as he wishes. The offensive player at the beginning of any scrimmage always has all the play control cards in his hand, and the only restriction on his use of them is his own football judgment.

*Peculiar features of the different types of play.*

1. Line plays:—

A. Some plays specify different gains and losses, depending on whether the play is at tackle or at guard. On these, both gains and losses are greater at tackle.

B. On tackle plays the ball is to be moved five yards laterally in the direction in which the play goes. There is no lateral change on guard plays.

C. The mark * on a gain or loss indicates that such gain or loss is reduced by half if the play starts on or within the defensive twenty-five yard line.

2. End plays:—

A. On end plays the ball is to be moved laterally fifteen yards in the direction in which the play goes.

B. The mark * on an end play reduces the gain one half if the play is directed toward an end less than fifteen yards away. Half yards go to the defensive side; but in the case of losses there is never a reduction.

3. Forward passes:—

A. Most of these cards state the length of the pass (measured from the line of scrimmage), and the distance that the catcher of the pass carries it, which is the same whether the pass is completed by the attacking side or intercepted and run back by the defensive side. Cards which have other developments represented on them carry their own instructions.

B. Most of the forward pass cards carry red figures—30—for example. Such a figure indicates the "danger zone". That is, the figure 30 indicates that for the particular play on which this pass is developed there is greater danger of interception when the play starts on or within the offensive team's thirty yard line. The figure 20 would indicate the same as to the twenty yard line, and so on.

C. When the figure is accompanied by an asterisk *30, this indicates that at each end of the field there is a danger zone on and within the line indicated; and that this pass on a play started on or within that line at either end is unsafe.

D. Effect of danger zone. The effect of a pass within the danger zone is to give the play development as it would have been if the defensive player had been one step better in his analysis than he actually was. That is, it moves the play, as represented on the field by the movement of the ball, one alternative further down toward the foot of the card on which it is turned. For example: The card turned reads: Pass 8, *20, carried 6, completed, incomplete, intercepted. The offensive team having thrown this pass on a play starting on or within either twenty-yard line, the danger zone rule goes into effect.

Thus, though the defensive player did not even guess "Pass"—that is, the general type of play, it is incomplete. If the defensive player guessed the general type of play, and failed only to guess the exact point of attack, the pass is intercepted. If he completely analyzed the play, there is no need for the danger zone rule to apply in his favor.

It is the duty of the defensive player to call attention to the presence of a danger zone mark on the pass card turned; the offensive player is under no obligation to do so; and the defensive player must speak of this before the card turned is replaced at the bottom of the pile from which it was taken, or no later protest will avail him.

Very important note.—Danger zone rules do not apply in the last period, or at any time in the second half against a player whose score, at the time he uses the play, is at least twelve points less than that of his opponent.

E. Of course, as in the real game, if an incompleted pass goes over the defensive goal line (indicated by the length of the pass) it is a touchback, and the defensive team receives the ball on its twenty yard line. But if a pass falls exactly on the line, owing to the distance of the attacking team from the goal and the length of the pass being identical, the arbitrary rule is that the pass did not go over, and is merely an ordinary incomplete pass.

4. Kicks: *a.* Punts:—

A. All punts are measured from the line of scrimmage (i. e., the position of the ball at the start of the play).

B. On "Punt right" and "Punt left" the ball is moved both to indicate the length of punt and run, and laterally ten yards to the side toward which the punt is directed.

C. The mark * on a punt card reduces a punt by one third if the side line is less than fifteen yards away on the side toward which the punt is indicated. This mark, of course, will never apply on punt center; nor on punt right when the side line is to the offensive team's left, and vice versa. Fractions are given to the punting side. At the distance thus indicated, the ball goes outside, and is, of course, not run back. It is given to the receiving team at this point, and twenty yards in from the side line, or less at the option of the team receiving.

D. When the length of a punt would carry it past the defensive five yard line, the receiver may choose whether to let the ball roll for a touchback, or to run it back. He may look at the punt card before doing this, and take the course which appears to him more to his advantage. If it would fall exactly on the five yard line, he must run it back.

5. Kicks: *b.* Field goals:—

A. On each card is indicated the distance at or within which the field goal attempt is successful. This sometimes differs as between drop kicks and placements, the latter being of greater length.

B. Unlike punts, the length of a kick for a field goal is measured (by means of the yard stick) by the actual distance from the position of the ball on the field to the nearer end of the goal post as indicated, and not from the line across the field on which the ball rests. That is, the yard stick is laid at a slant or diagonal, if necessary, directly from the ball to the nearer end of the goal posts, and the ball must be at or within the distance indicated in order for the attempt to succeed.

C. Dead zone. A dead zone lies at each corner of the field, bounded by the goal line and the side line, the third side being an imaginary line extending from the nearer end of the goal post to each end of the twenty yard line. If the play starts with the ball in a dead zone, any attempt at a field goal goes over the line for a touchback, regardless of the play card. In cases of doubt, the yard stick may be laid from the end of the twenty yard line to the nearer end of the goal post, to determine whether the ball lies within the dead zone or not. But this may not be done by the offensive player before he selects his play, since he must use his own judgment on the advisability of an attempted field goal.

D. The word Touchback at the bottom of a field goal card indicates that if there is no goal the ball goes over the line for a touchback. The ball is then given the defensive team at their twenty yard line, as in the real game.

E. The fraction ¾ followed by a certain number of yards, at the foot of a field goal card, indicates that if the goal fails the ball goes only three quarters of the distance from the line of scrimmage to the goal line, and must be run back by the defensive team the distance indicated. But if this would bring it within the defensive five yard line, the defensive team has the same option to run it back or let it roll for a touchback as under Punts, 3, above. The defensive player may look at the play card before making his choice.

*Trick or feint plays.*

(It is recommended that the trick plays should not be attempted until the players, by playing a few games, have familiarized themselves with the actual operation of play. Once that is understood, the trick plays will be found to add a good deal to the variety and interest of the game. They will prove especially valuable in "opening up" toward the end of the game, being by their nature rather decisive one way or the other.)

On trick plays the offensive player has at his disposal, in addition to the regular play control cards, the special trick play control cards. 1, Cross buck right; 2, Cross buck left (classed as line plays); 3, Lateral pass right end; and 4, Lateral pass left end (classed as end plays); and 5, Pass long (a forward pass play).

The extra set of play success cards known as the Trick play success cards is also used in trick plays.

When the offensive player wishes to use a trick play, the mode of operation is as follows:

1. The offensive player selects one card, which has no significance as indicating the nature of play, and lays it before him face up upon the table. This card in no way indicates what play he intends to use, but serves only to serve notice upon his opponent that the trick play method of operation instead of the regular method is to take effect. This card is called the Feint card, and may be any one of the regular play control cards.

2. The offensive player then selects his actual play, and lays it face down, as usual. Since a kick cannot be developed from a trick play, this Actual play card may not represent any kick, either punt or field goal, but may be any of the regular line play cards, or a cross buck, if the offensive player wishes a line play; either of the regular end play cards, or either lateral pass, if the offensive player wishes to employ an end play; or any of the regular passes or the pass long if the offensive player wishes to employ a forward pass. If the offensive player wishes to use for his actual play the play indicated on the feint play card, he puts down as his actual play card the card "Same play".

3. The defensive player now undertakes as usual to analyze the play. The method as will be seen involves one important difference from the regular play.

a. If the defensive player fails on either first or second attempt to make a correct diagnosis of the play, then there is no analysis, as in regular play.

b. If he succeeds only on his second attempt, there is a partial analysis, as in the regular way.

c. But if he succeeds on his first attempt to analyze the general type of play, then he is given two opportunities to analyze the exact play, and if either of his attempts to diagnose the exact play is successful there is a complete analysis.

4. When the analysis has been made, the offensive player reveals his actual play card, as usual. Now two play success cards are turned—the one on top of the pile of cards representing the type of play which was employed and the one on the top of the trick play success card pile. These are combined to reach the result: the regular play is interpreted as usual, according to the success of the analysis, and the distance gained or lost is increased or diminished by the alternative in the corresponding position on the trick play card. For example: Feint play, any card (say Left end). Actual play, Cross buck right. The top card of the trick play success pile is turned, and since the cross buck is a line play the top card of the line play success pile. Say these cards as turned read, respectively:

| Line. | Trick. |
|---|---|
| Gain 6 | +7 |
| Gain 2 | +1 |
| Loss 3 | —4 |

Result:
No analysis: Gain 6+7, that is 13 yards.
Partial analysis: Gain 2+1, that is 3 yards.
Complete analysis: Loss 3—4, that is 7 yards (the minus sign simply indicating additional loss).

Or again:
Feint play, any card (say Punt center). Actual play, Left end. The top card of the trick play pile is turned, and the top card of the end play pile. Say these cards read:

| End. | Trick. |
|---|---|
| Gain 9 | +8 |
| Gain 1 | —1 |
| Loss 6 | —3 |

Result:
No analysis: Gain 9+8, that is 17 yards.
Partial analysis: Gain 1—1, that is, no gain (the minus cancelling the gain of one yard indicated on the end card).
Complete analysis: Loss 6—3, that is, a loss of 9 yards.

*Important regulations.*

When the actual play is one of the regular forward passes, any additions or deductions are made on the length of the run after the pass is caught, and not to the length of the pass. Thus, if the pass is completed, it is carried further, and if it is intercepted it is run back further, the length of the pass always being that stated at the top of the play success card.

When the actual play is the pass long, a distance of eight yards is arbitrarily added to the length of the pass, besides the trick play addition to the length of the run. Thus, if the cards turned are respectively Pass 8.              Trick.
Run 3                +9
                       +1
Complete           —4
Incomplete
Intercepted the play used for actual play being Pass long, the result will be No analysis: Pass 8+8=16, run 3+9=12, total 28 yards.

Partial analysis: Pass incomplete.

Complete analysis: Pass 8+8=16, intercepted and run 3—4, that is, run back 7 yards from the point of interception.

Except in the last period, or at any time in second half by a player whose score is at least twelve points less than that of his opponent, the use of trick plays on successive plays is not permitted. That is, at least one regular play must intervene after a trick play has been used before another may be attempted. This is true without reference to the degree of success or failure of the trick plays employed. But in the second half a player whose score is twelve or more points less than that of his opponent may use trick plays as often as he wishes; and in the last period there is no restriction on either side as to the frequency of use of trick plays.

*Criss-cross.*—The criss-cross is not a trick play. When the offensive player, before placing his card face down upon the table, places face up on the table the Criss-cross card, it indicates that he wishes his actual play to count double the amount shown on the play success card. The defensive player's analysis is as in regular play and not as in trick play; and the offensive player is limited in his choice to the regular play cards, and may not use the trick play control cards as Cross bucks, Lateral passes, or Pass long. A kick of any kind is also impossible from Criss cross.

For example: The cross-cross card has been shown, and the actual play is Left end. The end card when turned shows: Gain 9, gain 2, loss 5.

Result, owing to the use of the Criss-cross card:

No analysis: Gain 18.
Partial analysis: Gain 4.
Complete analysis: Loss 10.

*Important rule.*—If a pass is thrown from Criss-cross, only the length of the run, as shown on the play success card, is doubled. The length of the pass remains the same.

*Restriction.*—A player may use the criss-cross not more than three times in any one period except the last. In the last period a player may use the criss-cross as often as he wishes.

*Miscellaneous provisions and suggestions.*

1. *Touchdowns.*—It will sometimes occur that the distance to the defensive goal line and the length of the gain as indicated by the turn of the card are exactly the same. To avoid argument, the following arbitrary rules are provided: *a.* That if the down is fourth down, this will constitute a touchdown. *b.* That if the down is not fourth down, the ball will be presumed to lie a few inches short of the line, so that an actual positive gain on a subsequent play will be necessary to score a touchdown. (This, of course, No gain will not do.) *c.* But if the ball is lying after such a play a few inches from the line, and the offensive team then suffers a loss, the loss is measured from the goal line, and not from the one yard line or between.

2. *Length of periods.*—Of course, players may arrange for this as they wish. It has been found by experience with the game that fifteen minute periods contain about the same amount of actual play as the average fifteen minute period in the real game.

3. *Wind.*—An interesting variation can be made by providing before the game that a wind of a given velocity is blowing from one end of the field. If it is decided to play with a ten per cent wind, then all punts and field goal attempts with the wind increase ten per cent in length, and those against the wind decrease ten per cent. If a wind is agreed upon, it is important to remember to change ends at the period intermissions.

4. *Toss.*—Players toss for choice of wind and kick as in the real game.

Also, a good many cards provide for toss. There are three situations:

*a.* A few cards are marked—Fumble—Toss for recovery. Here the team which had the ball calls the turn of the coin or other chance controlled means employed. If it calls correctly, it recovers.

*b.* Some cards are marked alternatively; for example,

Punt returned (Toss) 7 or 12 or Gain (Toss) 3 or 5. Here the team running with the ball calls the turn; if it calls successfully, it prevails and makes the larger gain.

*c.* Some cards have a run with various distances provided for; for example,

Punt returned (Toss) 4 or 11 or 17 or 39. Here the punting team calls the turn of the coin, the idea being that at each of these places a tackler tries to get the runner. If the punting team calls correctly the first time, the return (above) would be 4 yards; if wrong the first, but correct the second time, 11 yards; and so on. The catcher of the punt keeps running until at some point the punting side calls the turn correctly and stops him.

These toss plays are few in number; but their insertion seems desirable to provide for the "breaks," without which few games of football are played. Of course, they give neither side an advantage, except as luck favors the turn of the coin.

5. *Umpire or referee.*—It has proved an excellent idea, if a third person is available, to have him act in this capacity. He performs the following duties:

a. Turns the play cards.

b. Moves the ball, and announces the down and distance to be gained.

c. Figures the changes in punt distance, due to wind, if this is agreed upon.

d. Keeps time.

It is found that his presence and services really make the game more interesting, since the players can then concentrate their whole attention on their play.

6. In the absence of such official the duties are best divided as follows:

a. Offensive player, of course, turns the play control card in his hand.

b. Defensive player turns the play success card, since he has to be on the look-out for the mark * and the danger zone figures on passes. He also calls the amount of gain or loss.

c. The punting player figures the wind change on punts, and announces his result.

d. The offensive player moves the ball.

e. The defensive player measures distances, and lays the yard stick to determine the dead zone on drop kicks.

f. The defensive player announces the down and the distance to be gained.

7. *Conduct of participants.*—It should be considered highly improper for a player who happens to be in the lead in the last quarter to delay the game in any way, more than is necessary for giving thought to his plays and the analysis of his opponent's. But it is not improper for him to "play safe" by bucking the line, etc., any more than in the real game.

In case of any disagreement, time should be taken out until the disagreement is settled.

Most disagreements will be avoided if the defensive player is careful (or the umpire, if there is one) to announce down and distance after each play.

8. The rules of the actual game of football, as laid down in the official football rules, control absolutely, except so far as is provided for above.

9. Points are of course: touchdown 6, goal from field 3, safety 2, point after touchdown 1, touchback—no score.

10. It always adds interest if the players select colleges or schools in which they are interested to represent in the game.

Though I have developed in detail the rules which I have found best suited to govern the conduct of the game and which have been designed so far as possible to simulate actual football conditions, it is understood that various deviations may be made, both in the rules and apparatus described, without departing from the spirit and scope of the appended claims.

What I claim as new and desire to secure by Letters Patent is:—

1. In a football game apparatus, a board having goals and graduations in simulation of a football field, a piece in simulation of a football adapted to be moved over the face of the board, a measuring scale graduated in units of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said play success cards having indicia thereon indicative of a different degree of success when employed on certain parts of the board, certain of said play success cards bearing alternative indicia of success thereon, and chance controlled means for indicating which side shall prevail.

2. In a football game apparatus, a board having goals and graduations in simulation of a football field, a piece in simulation of a football adapted to be moved over the face of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said play success cards having indicia thereon indicative of a different degree of success when employed on certain parts of the board.

3. In a football game apparatus, a board having goals and graduations in simulation of a football field, a piece in simulation of a football adapted to be moved over the face of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successively diagnoses the generic nature of play only the middle graduation of success may control the offensive success of the play and if the defensive player fails to diagnose even the generic nature of play the greatest graduation of success may control the offensive success of the play, certain of said play success cards bearing alternative indicia of success thereon, and chance controlled means for indicating which side shall prevail.

4. In a football game apparatus, a board having goals and graduations in simulation of a football field, a piece in simulation of a football adapted to be moved over the face of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play.

5. In a football game apparatus, a board having goals and graduations in simulation of a football field, a piece in simulation of a football adapted to be moved over the face of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having graduated indicia of success thereon.

6. In a football game apparatus, a board having goals and graduations in simulation of a football field, a piece in simulation of a football adapted to be moved over the face of the board, sets of offensive play control cards, each set bearing indicia of generically different offensive plays and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into sets, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, and an additional play control card effective to change the proportion of gain or loss as evidenced by the turned play success card.

7. In a football game apparatus, a board having goals and graduations in simulation of a football field, a piece in simulation of a football adapted to be moved over the face of the board, offensive play control cards, each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards, each card having graduated indicia of success thereon.

8. In a football game apparatus, a board having goals and graduations in simulation of a football field, a piece in simulation of a football adapted to be moved over the face of the board, offensive play control cards, each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards, each card having graduated indicia of success thereon, certain of said play success cards having alternative indicia of success thereon, and chance controlled means for indicating which side shall prevail.

9. In a football game apparatus, a board having goals and transverse graduations in simulation of a football field and longitudinal graduations thereon, a piece in simulation of a football adapted to be moved over the face of the board and provided with means for detachable securement to the board, a measuring scale graduated in units of the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said line play success cards having indicia thereon indicative of a lesser degree of success when approaching the opponent's goal, certain of said end play success cards having indicia thereon indicative of a lesser degree of success when a play is chosen in the direction of an adjacent side line, certain of said pass play success cards having indicia thereon indicative of a lesser degree of success when employed near a goal line, a set of additional trick play control cards adapted to be used in conjunction with the regular play control cards, and a set of trick play success cards adapted to be turned by another player in addition to a respective play success card when a trick play control card is selected by the offensive player having three graduated indicia of success thereon additive as diagnosed to the degree of success on the play success card drawn, certain of said play success cards having alternative indicia of success thereon, and chance controlled means for indicating which side shall prevail, and an additional play control card effective to change the proportion of gain or loss as evidenced by the turned play success card.

10. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play.

11. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards, each divided into generic sets of end, line, kick and pass cards, each set bearing indicia corresponding to the generic indicia on the sets of play control cards and each card having graduated indicia of success thereon.

12. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said line play success cards having indicia thereon indicative of a lesser degree of success when approaching the opponent's goal.

13. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said end play success cards having indicia thereon indicative of a lesser degree of success when a play is chosen in the direction of an adjacent side line.

14. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said pass play success cards having indicia thereon indicative of a lesser degree of success when employed near a goal line.

15. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, a set of additional trick play control cards adapted to be used in conjunction with the regular play control cards, and a set of trick play success cards adapted to be turned by another player in addition to a respective play success card when a trick play control card is selected by the offensive player having three graduated indicia of success thereon additive as diagnosed to the degree of success on the play success card drawn.

16. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia on the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, certain of said play success cards having alternative indicia of success thereon, and chance controlled means for indicating which side shall prevail.

17. In a football game apparatus, a board having goals and transverse graduations in simulation of a football field and longitudinal graduations thereon, a piece in simulation of a football adapted to be moved over the face of the board and provided with means for detachable securement to the board, sets of offensive play control cards, each set bearing indicia of generically different offensive plays, comprising end, line, kick and pass sets, and each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards divided into generic sets of end, line, kick and pass cards, each set bearing indicia corresponding to the generic indicia of the sets of play control cards and each card having three graduated indicia of success thereon whereby if the defensive player successfully diagnoses both the generic and specific nature of play the least graduation of success may control the offensive success of the play, if the defensive player successfully diagnoses the generic nature of play only the middle graduation of success may control the offensive success of the play and if the defensive player fails to diagnose even the generic nature of play the greatest graduation of success may control the offensive success of the play, and an additional play control card effective to change the proportion of gain or loss as evidenced by the turned play success card.

18. In a football game apparatus, a board having goals and graduations in simulation of a football field, a piece in simulation of a football adapted to be moved over the face of the board, offensive play control cards, each card bearing specific indicia of the exact nature and direction of play whereby the card indicative of the desired play may be selectively chosen by the offensive player and laid face down, and play success cards adapted to be individually turned in shuffled rotation face down by another person card for card with the offensive play control cards, each card having graduated indicia of success thereon, certain of said play success cards having indicia thereon indicative of a different degree of success when employed on certain parts of the board.

In testimony whereof I affix my signature.

FRANCIS W. JACOB.